Patented Aug. 5, 1924.

1,503,604

UNITED STATES PATENT OFFICE.

PAUL C. SEEL, OF ROCHESTER, NEW YORK, ASSIGNOR TO EASTMAN KODAK COMPANY, OF ROCHESTER, NEW YORK, A CORPORATION OF NEW YORK.

PROCESS OF MAKING CELLULOSE ETHER.

No Drawing.  Application filed February 2, 1922. Serial No. 533,656.

*To all whom it may concern:*

Be it known that I, PAUL C. SEEL, a citizen of the United States of America, residing at Rochester, in the county of Monroe and State of New York, have invented certain new and useful Improvements in Processes of Making Cellulose Ether, of which the following is a full, clear, and exact specification.

This invention relates to the manufacture of cellulose ethers. One object of the invention is to provide a process by which a uniform product may be obtained. Another object of the invention is to provide a process which will yield ethers from which films of great clearness may be made. Other objects will hereinafter appear.

I have found that etherification of the cellulose by prior methods (such for instance as that set forth in my application Serial No. 458,748, filed Apr. 5, 1921) will be greatly facilitated and the resulting product be made very uniform, if the cellulose be first treated with a dilute solution of a strong mineral acid and then washed free from such acid prior to mixing with the alkali and other agents for the etherifying reaction.

By way of example, I may treat cellulose, such as cotton linters, with a dilute solution of a strong mineral acid, like sulfuric acid, for example from $\frac{1}{4}$ to $1\frac{1}{2}$ per cent strength by weight, say approximately $\frac{1}{2}$ per cent, for several hours at an elevated temperature. Thus when dilute sulfuric acid of .8 per cent is employed, the cotton may soak therein for two hours at 170° F. The stronger the dilute acid, the less will be the temperature required for a given time of soaking; and the less the time of soaking, the higher the temperature.

Strong acids in such proportion as to have an equivalent hydrogen ion concentration may be substituted for the sulfuric acid, such as hydrochloric acid and nitric acid, or mixtures of them.

The acid is removed by any suitable washing method. I find that it is advantageous, although not necessary, to repeatedly spray or soak the acidified fibers with water and repeatedly squeeze out the latter.

The cellulose prepared in this way does not have the molecule harmfully broken down, but my experience shows that it does etherify readily and particularly with great uniformity, so that the product is comparatively free from unethylated fibers and less haze appears in films made therefrom.

The prepared fibers may be etherified in any of the known ways, such as by the method disclosed in my application No. 458,748, hereinabove referred to.

Having thus described my invention, what I claim as new and desire to secure by Letters Patent is:

1. The process of making cellulose ether, which comprises the steps of treating cellulose with a dilute solution of a strong mineral acid, removing said acid before harmful molecular breakdown occurs, and reacting upon the treated cellulose with etherifying reagents.

2. The process of making cellulose ether, which comprises the steps of treating cellulose with a warm $\frac{1}{4}$ to $1\frac{1}{2}$ per cent aqueous solution of a strong mineral acid before harmful molecular breakdown occurs, removing said acid and reacting upon the treated cellulose with etherifying reagents.

3. The process of making cellulose ether, which comprises the steps of treating cotton fibers with approximately a $\frac{1}{2}$ per cent solution of sulfuric acid at approximately 170° F., for approximately two hours, washing out said acid and reacting upon the treated cotton with etherifying reagents.

Signed at Rochester, New York, this 23rd day of January, 1922.

PAUL C. SEEL.

Certificate of Correction.

It is hereby certified that in Letters Patent No. 1,503,604, granted August 5, 1924, upon the application of Paul C. Seel, of Rochester, New York, for an improvement in "Processes of Making Cellulose Ether," an error appears in the printed specification requiring correction as follows: Page 1, lines 75 and 76, claim 2, strike out the words " before harmful molecular breakdown occurs " and insert the same to follow the word " acid ", line 77, same claim; and that the said Letters Patent should be read with this correction therein that the same may conform to the record of the case in the Patent Office.

Signed and sealed this 2d day of September, A. D. 1924.

[SEAL.]
KARL FENNING,
*Acting Commissioner of Patents.*